(12) United States Patent
Jeddeloh

(10) Patent No.: US 7,412,574 B2
(45) Date of Patent: Aug. 12, 2008

(54) SYSTEM AND METHOD FOR ARBITRATION OF MEMORY RESPONSES IN A HUB-BASED MEMORY SYSTEM

(75) Inventor: Joseph M. Jeddeloh, Shoreview, MN (US)

(73) Assignee: Micron Technology, Inc., Boise, ID (US)

( * ) Notice: Subject to any disclaimer, the term of this patent is extended or adjusted under 35 U.S.C. 154(b) by 341 days.

(21) Appl. No.: 10/773,520

(22) Filed: Feb. 5, 2004

(65) Prior Publication Data

US 2005/0177677 A1    Aug. 11, 2005

(51) Int. Cl.
G06F 13/20    (2006.01)
G06F 12/06    (2006.01)
G06F 12/02    (2006.01)

(52) U.S. Cl. .................. 711/158; 711/167; 711/137
(58) Field of Classification Search ............... None
See application file for complete search history.

(56) References Cited

U.S. PATENT DOCUMENTS

| | | | |
|---|---|---|---|
| 3,742,253 A | 6/1973 | Kronies | 307/247 |
| 4,045,781 A | 8/1977 | Levy et al. | 364/200 |
| 4,078,228 A | 3/1978 | Miyazaki | 340/147 R |
| 4,240,143 A | 12/1980 | Besemer et al. | 364/200 |
| 4,245,306 A | 1/1981 | Besemer et al. | 364/200 |
| 4,253,144 A | 2/1981 | Bellamy et al. | 364/200 |
| 4,253,146 A | 2/1981 | Bellamy et al. | 364/200 |
| 4,608,702 A | 8/1986 | Hirzel et al. | 375/110 |
| 4,707,823 A | 11/1987 | Holdren et al. | 370/1 |
| 4,724,520 A | 2/1988 | Athanas et al. | 364/200 |
| 4,831,520 A | 5/1989 | Rubinfeld et al. | 364/200 |
| 4,843,263 A | 6/1989 | Ando | 307/480 |
| 4,891,808 A | 1/1990 | Williams | 370/112 |
| 4,930,128 A | 5/1990 | Suzuki et al. | 371/12 |
| 4,953,930 A | 9/1990 | Ramsey et al. | 385/14 |
| 4,982,185 A | 1/1991 | Holmberg et al. | 340/825.21 |
| 5,241,506 A | 8/1993 | Motegi et al. | 365/210 |
| 5,243,703 A | 9/1993 | Farmwald et al. | 395/325 |

(Continued)

FOREIGN PATENT DOCUMENTS

EP    0 709 786 A1    5/1996

(Continued)

OTHER PUBLICATIONS

Intel, "Intel 840 Chipset: 82840 Memory Controller Hub (MCH)", Datasheet, Oct. 1999, pp. 1-178.

(Continued)

Primary Examiner—Hyung S. Sough
Assistant Examiner—Duc T. Doan
(74) Attorney, Agent, or Firm—Dorsey & Whitney LLP

(57) ABSTRACT

A memory hub module includes a decoder that receives memory requests determines a memory request identifier associated with each memory request. A packet memory receives memory request identifiers and stores the memory request identifiers. A packet tracker receives remote memory responses and associates each remote memory response with a memory request identifier and removes the memory request identifier from the packet memory. A multiplexor receives remote memory responses and local memory responses. The multiplexor selects an output responsive to a control signal. Arbitration control logic is coupled to the multiplexor and the packet memory and develops the control signal to select a memory response for output.

37 Claims, 3 Drawing Sheets

U.S. PATENT DOCUMENTS

| | | | | |
|---|---|---|---|---|
| 5,251,303 | A | 10/1993 | Fogg, Jr. et al. | 395/275 |
| 5,269,022 | A | 12/1993 | Shinjo et al. | 395/700 |
| 5,299,293 | A | 3/1994 | Mestdagh et al. | 359/110 |
| 5,313,590 | A | 5/1994 | Taylor | 395/325 |
| 5,317,752 | A | 5/1994 | Jewett et al. | 395/750 |
| 5,319,755 | A | 6/1994 | Farmwald et al. | 395/325 |
| 5,355,391 | A | 10/1994 | Horowitz et al. | 375/36 |
| 5,432,823 | A | 7/1995 | Gasbarro et al. | 375/356 |
| 5,432,907 | A | 7/1995 | Picazo, Jr. et al. | 395/200 |
| 5,442,770 | A | 8/1995 | Barratt | 395/403 |
| 5,461,627 | A | 10/1995 | Rypinski | 370/95.2 |
| 5,465,229 | A | 11/1995 | Bechtolsheim et al. | 345/477 |
| 5,479,370 | A | 12/1995 | Furuyama et al. | 365/189.12 |
| 5,497,476 | A | 3/1996 | Oldfield et al. | 395/439 |
| 5,502,621 | A | 3/1996 | Schumacher et al. | 361/760 |
| 5,544,319 | A | 8/1996 | Acton et al. | 395/200.07 |
| 5,566,325 | A | 10/1996 | Bruce, II et al. | 395/494 |
| 5,577,220 | A | 11/1996 | Combs et al. | 395/416 |
| 5,581,767 | A | 12/1996 | Katsuki et al. | 395/800 |
| 5,606,717 | A | 2/1997 | Farmwald et al. | 395/856 |
| 5,638,334 | A | 6/1997 | Farmwald et al. | 365/230.03 |
| 5,659,798 | A | 8/1997 | Blumrich et al. | 395/846 |
| 5,687,325 | A | 11/1997 | Chang | 395/284 |
| 5,706,224 | A | 1/1998 | Srinivasan et al. | 365/49 |
| 5,715,456 | A | 2/1998 | Bennett et al. | 395/652 |
| 5,729,709 | A | 3/1998 | Harness | 395/405 |
| 5,748,616 | A | 5/1998 | Riley | 370/242 |
| 5,818,844 | A | 10/1998 | Singh et al. | 370/463 |
| 5,819,304 | A | 10/1998 | Nilsen et al. | 711/5 |
| 5,822,255 | A | 10/1998 | Uchida | 365/194 |
| 5,832,250 | A | 11/1998 | Whittaker | 395/471 |
| 5,875,352 | A | 2/1999 | Gentry et al. | 395/843 |
| 5,875,454 | A | 2/1999 | Craft et al. | 711/113 |
| 5,928,343 | A | 7/1999 | Farmwald et al. | 710/104 |
| 5,966,724 | A | 10/1999 | Ryan | 711/105 |
| 5,973,935 | A | 10/1999 | Schoenfeld et al. | 361/813 |
| 5,973,951 | A | 10/1999 | Bechtolsheim et al. | 365/52 |
| 5,978,567 | A | 11/1999 | Rebane et al. | 395/200.49 |
| 5,987,196 | A | 11/1999 | Noble | 385/14 |
| 6,014,721 | A | 1/2000 | Arimilli et al. | 710/129 |
| 6,023,726 | A | 2/2000 | Saksena | 709/219 |
| 6,029,250 | A | 2/2000 | Keeth | 713/400 |
| 6,031,241 | A | 2/2000 | Silfvast et al. | 250/504 R |
| 6,033,951 | A | 3/2000 | Chao | 438/253 |
| 6,038,630 | A | 3/2000 | Foster et al. | 710/132 |
| 6,061,263 | A | 5/2000 | Boaz et al. | 365/51 |
| 6,061,296 | A | 5/2000 | Ternullo, Jr. et al. | 365/233 |
| 6,064,706 | A | 5/2000 | Driskill et al. | 375/372 |
| 6,067,262 | A | 5/2000 | Irrinki et al. | 365/201 |
| 6,067,649 | A | 5/2000 | Goodwin | 714/718 |
| 6,073,190 | A | 6/2000 | Rooney | 710/56 |
| 6,076,139 | A | 6/2000 | Welker et al. | 711/104 |
| 6,079,008 | A | 6/2000 | Clery, III | 712/11 |
| 6,098,158 | A | 8/2000 | Lay et al. | 711/162 |
| 6,100,735 | A | 8/2000 | Lu | 327/158 |
| 6,105,075 | A | 8/2000 | Ghaffari | 710/5 |
| 6,125,431 | A | 9/2000 | Kobayashi | 711/154 |
| 6,134,624 | A | 10/2000 | Burns et al. | 710/131 |
| 6,137,709 | A | 10/2000 | Boaz et al. | 365/51 |
| 6,144,587 | A | 11/2000 | Yoshida | 365/189.05 |
| 6,167,465 | A | 12/2000 | Parvin et al. | 710/22 |
| 6,167,486 | A | 12/2000 | Lee et al. | 711/120 |
| 6,175,571 | B1 | 1/2001 | Haddock et al. | 370/423 |
| 6,185,352 | B1 | 2/2001 | Hurley | 385/114 |
| 6,186,400 | B1 | 2/2001 | Dvorkis et al. | 235/462.45 |
| 6,191,663 | B1 | 2/2001 | Hannah | 333/17.3 |
| 6,201,724 | B1 | 3/2001 | Ishizaki et al. | 365/49 |
| 6,208,180 | B1 | 3/2001 | Fisch et al. | 327/141 |
| 6,233,376 | B1 | 5/2001 | Updegrove | 385/14 |
| 6,243,769 | B1 | 6/2001 | Rooney | 710/56 |
| 6,243,831 | B1 | 6/2001 | Mustafa et al. | 714/24 |
| 6,246,618 | B1 | 6/2001 | Yamamoto et al. | 365/200 |
| 6,247,107 | B1 | 6/2001 | Christie | 711/216 |
| 6,249,802 | B1 | 6/2001 | Richardson et al. | 709/200 |
| 6,256,325 | B1 | 7/2001 | Park | 370/503 |
| 6,256,692 | B1 | 7/2001 | Yoda et al. | 710/104 |
| 6,272,600 | B1 | 8/2001 | Talbot et al. | 711/140 |
| 6,272,609 | B1 | 8/2001 | Jeddeloh | 711/169 |
| 6,278,755 | B1 | 8/2001 | Baba et al. | 375/360 |
| 6,285,349 | B1 | 9/2001 | Smith | 345/147 |
| 6,286,083 | B1 | 9/2001 | Chin et al. | 711/151 |
| 6,289,068 | B1 | 9/2001 | Hassoun et al. | 375/376 |
| 6,294,937 | B1 | 9/2001 | Crafts et al. | 327/158 |
| 6,301,637 | B1 | 10/2001 | Krull et al. | 711/112 |
| 6,324,485 | B1 | 11/2001 | Ellis | 702/117 |
| 6,327,642 | B1 | 12/2001 | Lee et al. | 711/120 |
| 6,330,205 | B2 | 12/2001 | Shimizu et al. | 365/230.06 |
| 6,347,055 | B1 | 2/2002 | Motomura | 365/189.05 |
| 6,349,363 | B2 | 2/2002 | Cai et al. | 711/129 |
| 6,356,573 | B1 | 3/2002 | Jonsson et al. | 372/46 |
| 6,367,074 | B1 | 4/2002 | Bates et al. | 717/11 |
| 6,370,068 | B2 | 4/2002 | Rhee | 365/196 |
| 6,373,777 | B1 | 4/2002 | Suzuki | 365/230.03 |
| 6,381,190 | B1 | 4/2002 | Shinkai | 365/230.03 |
| 6,392,653 | B1 | 5/2002 | Malandain et al. | 345/501 |
| 6,401,213 | B1 | 6/2002 | Jeddeloh | 713/401 |
| 6,405,280 | B1 | 6/2002 | Ryan | 711/105 |
| 6,421,744 | B1 | 7/2002 | Morrison et al. | 710/22 |
| 6,430,696 | B1 | 8/2002 | Keeth | 713/503 |
| 6,434,639 | B1 | 8/2002 | Haghighi | 710/39 |
| 6,434,696 | B1 | 8/2002 | Kang | 713/2 |
| 6,434,736 | B1 | 8/2002 | Schaecher et al. | 716/17 |
| 6,438,622 | B1 | 8/2002 | Haghighi et al. | 710/1 |
| 6,438,668 | B1 | 8/2002 | Esfahani et al. | 711/165 |
| 6,449,308 | B1 | 9/2002 | Knight, Jr. et al. | 375/212 |
| 6,453,393 | B1 | 9/2002 | Holman et al. | 711/154 |
| 6,462,978 | B2 | 10/2002 | Shibata et al. | 365/63 |
| 6,463,059 | B1 | 10/2002 | Movshovich et al. | 370/389 |
| 6,467,013 | B1 | 10/2002 | Nizar | 711/1 |
| 6,470,422 | B2 | 10/2002 | Cai et al. | 711/129 |
| 6,473,828 | B1 | 10/2002 | Matsui | 711/104 |
| 6,477,592 | B1 | 11/2002 | Chen et al. | 710/52 |
| 6,477,614 | B1 | 11/2002 | Leddige et al. | 711/5 |
| 6,477,621 | B1 | 11/2002 | Lee et al. | 711/120 |
| 6,479,322 | B2 | 11/2002 | Kawata et al. | 438/109 |
| 6,487,556 | B1 | 11/2002 | Downs et al. | 707/101 |
| 6,490,188 | B2 | 12/2002 | Nuxoll et al. | 365/63 |
| 6,496,909 | B1 | 12/2002 | Schimmel | 711/163 |
| 6,501,471 | B1 | 12/2002 | Venkataraman et al. | 345/424 |
| 6,505,287 | B2 | 1/2003 | Uematsu | 711/170 |
| 6,523,092 | B1 | 2/2003 | Fanning | 711/134 |
| 6,523,093 | B1 | 2/2003 | Bogin et al. | 711/137 |
| 6,526,483 | B1 | 2/2003 | Cho et al. | 711/154 |
| 6,539,490 | B1 | 3/2003 | Forbes et al. | 713/401 |
| 6,552,564 | B1 | 4/2003 | Forbes et al. | 326/30 |
| 6,565,329 | B2 | 5/2003 | Yokomachi et al. | 417/269 |
| 6,587,912 | B2 | 7/2003 | Leddige et al. | 711/5 |
| 6,590,816 | B2 | 7/2003 | Perner | 365/200 |
| 6,594,713 | B1 | 7/2003 | Fuoco et al. | 710/31 |
| 6,594,722 | B1 | 7/2003 | Willke, II et al. | 710/313 |
| 6,598,154 | B1 | 7/2003 | Vaid et al. | 712/237 |
| 6,615,325 | B2 | 9/2003 | Mailloux et al. | 711/154 |
| 6,622,188 | B1 | 9/2003 | Goodwin et al. | 710/101 |
| 6,622,227 | B2 | 9/2003 | Zumkehr et al. | 711/167 |
| 6,628,294 | B1 | 9/2003 | Sadowsky et al. | 345/568 |
| 6,629,220 | B1 | 9/2003 | Dyer | 711/158 |
| 6,631,440 | B2 | 10/2003 | Jenne et al. | 711/105 |
| 6,636,110 | B1 | 10/2003 | Ooishi et al. | 327/565 |
| 6,636,912 | B2 | 10/2003 | Ajanovic et al. | 710/105 |
| 6,646,929 | B1 | 11/2003 | Moss et al. | 365/194 |
| 6,658,509 | B1 | 12/2003 | Bonella et al. | 710/100 |
| 6,662,304 | B2 | 12/2003 | Keeth et al. | 713/400 |
| 6,665,202 | B2 | 12/2003 | Lindahl et al. | 365/49 |
| 6,667,895 | B2 | 12/2003 | Jang et al. | 365/63 |

| | | | |
|---|---|---|---|
| 6,667,926 B1 | 12/2003 | Chen et al. | 365/221 |
| 6,670,833 B2 | 12/2003 | Kurd et al. | 327/156 |
| 6,681,292 B2 | 1/2004 | Creta et al. | 711/119 |
| 6,697,926 B2 | 2/2004 | Johnson et al. | 711/167 |
| 6,715,018 B2 | 3/2004 | Farnworth et al. | 710/300 |
| 6,718,440 B2 | 4/2004 | Maiyuran et al. | 711/137 |
| 6,721,195 B2 | 4/2004 | Brunelle et al. | 365/63 |
| 6,721,860 B2 | 4/2004 | Klein | 711/154 |
| 6,724,685 B2 | 4/2004 | Braun et al. | 365/233 |
| 6,728,800 B1 | 4/2004 | Lee et al. | 710/54 |
| 6,735,679 B1 | 5/2004 | Herbst et al. | 711/167 |
| 6,735,682 B2 | 5/2004 | Segelken et al. | 711/220 |
| 6,745,275 B2 | 6/2004 | Chang | 710/305 |
| 6,751,703 B2 | 6/2004 | Chilton | 711/113 |
| 6,754,812 B1 | 6/2004 | Abdallah et al. | 712/234 |
| 6,756,661 B2 | 6/2004 | Tsuneda et al. | 257/673 |
| 6,760,833 B1 | 7/2004 | Dowling | 712/34 |
| 6,771,538 B2 | 8/2004 | Shukuri et al. | 365/185.05 |
| 6,775,747 B2 | 8/2004 | Venkatraman | 711/137 |
| 6,782,435 B2 | 8/2004 | Garcia et al. | 710/33 |
| 6,789,173 B1 | 9/2004 | Tanaka et al. | 711/147 |
| 6,792,059 B2 | 9/2004 | Yuan et al. | 375/354 |
| 6,792,496 B2 | 9/2004 | Aboulenein et al. | 710/306 |
| 6,795,899 B2 | 9/2004 | Dodd et al. | 711/137 |
| 6,799,246 B1 | 9/2004 | Wise et al. | 711/117 |
| 6,799,268 B1 | 9/2004 | Boggs et al. | 712/228 |
| 6,804,760 B2 | 10/2004 | Wiliams | 711/170 |
| 6,804,764 B2 | 10/2004 | LaBerge et al. | 711/170 |
| 6,807,630 B2 | 10/2004 | Lay et al. | 713/2 |
| 6,811,320 B1 | 11/2004 | Abbott | 385/58 |
| 6,816,947 B1 | 11/2004 | Huffman | 711/151 |
| 6,820,181 B2 | 11/2004 | Jeddeloh et al. | 711/169 |
| 6,821,029 B1 | 11/2004 | Grung et al. | 385/92 |
| 6,823,023 B1 | 11/2004 | Hannah | 375/296 |
| 6,845,409 B1 | 1/2005 | Talagala et al. | 710/20 |
| 6,901,494 B2 * | 5/2005 | Zumkehr et al. | 711/167 |
| 6,904,556 B2 | 6/2005 | Walton et al. | 714/766 |
| 6,910,109 B2 | 6/2005 | Holman et al. | 711/156 |
| 6,912,612 B2 * | 6/2005 | Kapur et al. | 710/309 |
| 6,947,672 B2 | 9/2005 | Jiang et al. | 398/135 |
| 7,046,060 B1 | 5/2006 | Minzoni et al. | 327/158 |
| 7,068,085 B2 | 6/2006 | Gomm et al. | 327/158 |
| 7,116,143 B2 | 10/2006 | Deivasigamani et al. | 327/149 |
| 7,181,584 B2 | 2/2007 | LaBerge | 711/167 |
| 7,187,742 B1 | 3/2007 | Logue et al. | 375/376 |
| 2001/0038611 A1 | 11/2001 | Darcie et al. | 370/248 |
| 2001/0039612 A1 | 11/2001 | Lee | 713/2 |
| 2002/0112119 A1 | 8/2002 | Halbert et al. | 711/115 |
| 2002/0116588 A1 | 8/2002 | Beckert et al. | 711/161 |
| 2002/0144064 A1 | 10/2002 | Fanning | 711/144 |
| 2003/0005223 A1 | 1/2003 | Coulson et al. | 711/118 |
| 2003/0005344 A1 | 1/2003 | Bhamidipati et al. | 713/400 |
| 2003/0043158 A1 | 3/2003 | Wasserman et al. | 345/545 |
| 2003/0043426 A1 | 3/2003 | Baker et al. | 359/109 |
| 2003/0093630 A1 | 5/2003 | Richard et al. | 711/154 |
| 2003/0149809 A1 | 8/2003 | Jensen et al. | 710/22 |
| 2003/0156581 A1 * | 8/2003 | Osborne | 370/389 |
| 2003/0163649 A1 | 8/2003 | Kapur et al. | 711/146 |
| 2003/0177320 A1 | 9/2003 | Sah et al. | 711/158 |
| 2003/0193927 A1 | 10/2003 | Hronik | 370/351 |
| 2003/0217223 A1 | 11/2003 | Nino, Jr. et al. | 711/105 |
| 2003/0229762 A1 | 12/2003 | Maiyuran et al. | 711/137 |
| 2003/0229770 A1 | 12/2003 | Jeddeloh | 711/213 |
| 2004/0024948 A1 | 2/2004 | Winkler et al. | 710/311 |
| 2004/0034753 A1 | 2/2004 | Jeddeloh | 711/163 |
| 2004/0107306 A1 * | 6/2004 | Barth et al. | 710/310 |
| 2004/0126115 A1 | 7/2004 | Levy et al. | 398/116 |
| 2004/0128449 A1 | 7/2004 | Osborne et al. | 711/137 |
| 2004/0144994 A1 | 7/2004 | Lee et al. | 257/200 |
| 2004/0160206 A1 | 8/2004 | Komaki et al. | 318/569 |
| 2004/0193821 A1 | 9/2004 | Ruhovets et al. | 711/167 |
| 2004/0199739 A1 | 10/2004 | Jeddeloh | 711/169 |
| 2004/0225847 A1 | 11/2004 | Wastlick et al. | 711/158 |
| 2004/0236885 A1 | 11/2004 | Fredriksson et al. | 710/100 |
| 2004/0251936 A1 | 12/2004 | Gomm | 327/141 |
| 2005/0015426 A1 * | 1/2005 | Woodruff et al. | 709/200 |
| 2005/0071542 A1 | 3/2005 | Weber et al. | 711/105 |
| 2005/0105350 A1 * | 5/2005 | Zimmerman | 365/201 |
| 2005/0122153 A1 | 6/2005 | Lin | 327/291 |
| 2005/0149603 A1 * | 7/2005 | DeSota et al. | 709/200 |
| 2005/0166006 A1 | 7/2005 | Talbot et al. | 711/105 |
| 2006/0022724 A1 | 2/2006 | Zerbe et al. | 327/141 |
| 2006/0271746 A1 | 11/2006 | Meyer et al. | 711/148 |

FOREIGN PATENT DOCUMENTS

| EP | 0849685 A2 | 6/1998 |
|---|---|---|
| JP | 2001265539 A | 9/2001 |
| WO | WO 93/19422 | 9/1993 |
| WO | WO 02/27499 A2 | 4/2002 |

OTHER PUBLICATIONS

Micron Technology, Inc., "Synchronous DRAM Module 512MB/ 1GB (x72, ECC) 168-PIN Registered FBGA SDRAM DIMM", Micron Technology, Inc., 2002, pp. 1-23.

Rambus, Inc., "Direct Rambus Technology Disclosure", Oct. 1997, pp. 1-16.

* cited by examiner

SYSTEM AND METHOD FOR ARBITRATION OF MEMORY RESPONSES IN A HUB-BASED MEMORY SYSTEM

TECHNICAL FIELD

This invention relates to computer systems, and, more particularly, to a computer system including a system memory having a memory hub architecture.

BACKGROUND OF THE INVENTION

Computer systems use memory devices, such as dynamic random access memory ("DRAM") devices, to store data that are accessed by a processor. These memory devices are normally used as system memory in a computer system. In a typical computer system, the processor communicates with the system memory through a processor bus and a memory controller. The processor issues a memory request, which includes a memory command, such as a read command, and an address designating the location from which data or instructions are to be read. The memory controller uses the command and address to generate appropriate command signals as well as row and column addresses, which are applied to the system memory. In response to the commands and addresses, data are transferred between the system memory and the processor. The memory controller is often part of a system controller, which also includes bus bridge circuitry for coupling the processor bus to an expansion bus, such as a PCI bus.

Although the operating speed of memory devices has continuously increased, this increase in operating speed has not kept pace with increases in the operating speed of processors. Even slower has been the increase in operating speed of memory controllers coupling processors to memory devices. The relatively slow speed of memory controllers and memory devices limits the data bandwidth between the processor and the memory devices.

In addition to the limited bandwidth between processors and memory devices, the performance of computer systems is also limited by latency problems that increase the time required to read data from system memory devices. More specifically, when a memory device read command is coupled to a system memory device, such as a synchronous DRAM ("SDRAM") device, the read data are output from the SDRAM device only after a delay of several clock periods. Therefore, although SDRAM devices can synchronously output burst data at a high data rate; the delay in initially providing the data can significantly slow the operating speed of a computer system using such SDRAM devices.

One approach to alleviating the memory latency problem is to use multiple memory devices coupled to the processor through a memory hub. In a memory hub architecture, a memory hub controller is coupled over a high speed data link to several memory modules. Typically, the memory modules are coupled in a point-to-point or daisy chain architecture such that the memory modules are connected one to another in series. Thus, the memory hub controller is coupled to a first memory module over a first high speed data link, with the first memory module connected to a second memory module through a second high speed data link, and the second memory module coupled to a third memory module through a third high speed data link, and so on in a daisy chain fashion. Each memory module includes a memory hub that is coupled to the corresponding high speed data links and a number of memory devices on the module, with the memory hubs efficiently routing memory requests and memory responses between the controller and the memory devices over the high speed data links. Each memory requests typically includes a memory command specifying the type of memory access (e.g., a read or a write) called for by the request, a memory address specifying a memory location that is to be accessed, and, in the case of a write memory request, write data. The memory request also normally includes information identifying the memory module that is being accessed, but this can be accomplished by mapping different addresses to different memory modules. A memory response is typically provided only for a read memory request, and typically includes read data as well as an identifying header that allows the memory hub controller to identify the memory request corresponding to the memory response. However, it should be understood that memory requests and memory responses having other characteristics may be used. In any case, in the following description, memory requests issued by the memory hub controller propagate downstream from one memory hub to another, while memory responses propagate upstream from one memory hub to another until reaching the memory hub controller. Computer systems employing this architecture can have a higher bandwidth because a processor can access one memory device while another memory device is responding to a prior memory access. For example, the processor can output write data to one of the memory devices in the system while another memory device in the system is preparing to provide read data to the processor. Moreover, this architecture also provides for easy expansion of the system memory without concern for degradation in signal quality as more memory modules are added, such as occurs in conventional multi drop bus architectures.

Although computer systems using memory hubs may provide superior performance, they nevertheless may often fail to operate at optimum speeds for a variety of reasons. For example, even though memory hubs can provide computer systems with a greater memory bandwidth, they still suffer from latency problems of the type described above. More specifically, although the processor may communicate with one memory device while another memory device is preparing to transfer data, it is sometimes necessary to receive data from one memory device before the data from another memory device can be used. In the event data must be received from one memory device before data received from another memory device can be used, the latency problem continues to slow the operating speed of such computer systems.

Another factor that can reduce the speed of memory transfers in a memory hub system is the transferring of read data upstream (i.e., back to the memory hub controller) over the high-speed links from one hub to another. Each hub must determine whether to send local responses first or to forward responses from downstream memory hubs first, and the way in which this is done affects the actual latency of a specific response, and more so, the overall latency of the system memory. This determination may be referred to as arbitration, with each hub arbitrating between local requests and upstream data transfers.

There is a need for a system and method for arbitrating data transfers in a system memory having a memory hub architecture to lower the latency of the system memory.

SUMMARY OF THE INVENTION

According to one aspect of the present invention, a memory hub module includes a decoder that receives memory requests and determines a memory request identifier associated with each memory request. A packet memory receives memory request identifiers and stores the memory request identifiers. A packet tracker receives remote memory responses, associates each remote memory response with a memory request identifier and removes the memory request identifier from the packet memory. A multiplexor receives remote memory responses and local memory responses. The multiplexor selects an output responsive to a control signal. Arbitration control logic coupled to the multiplexor and the packet memory develops the control signal to select a memory response for output.

DETAILED DESCRIPTION OF THE INVENTION

Figure 1:
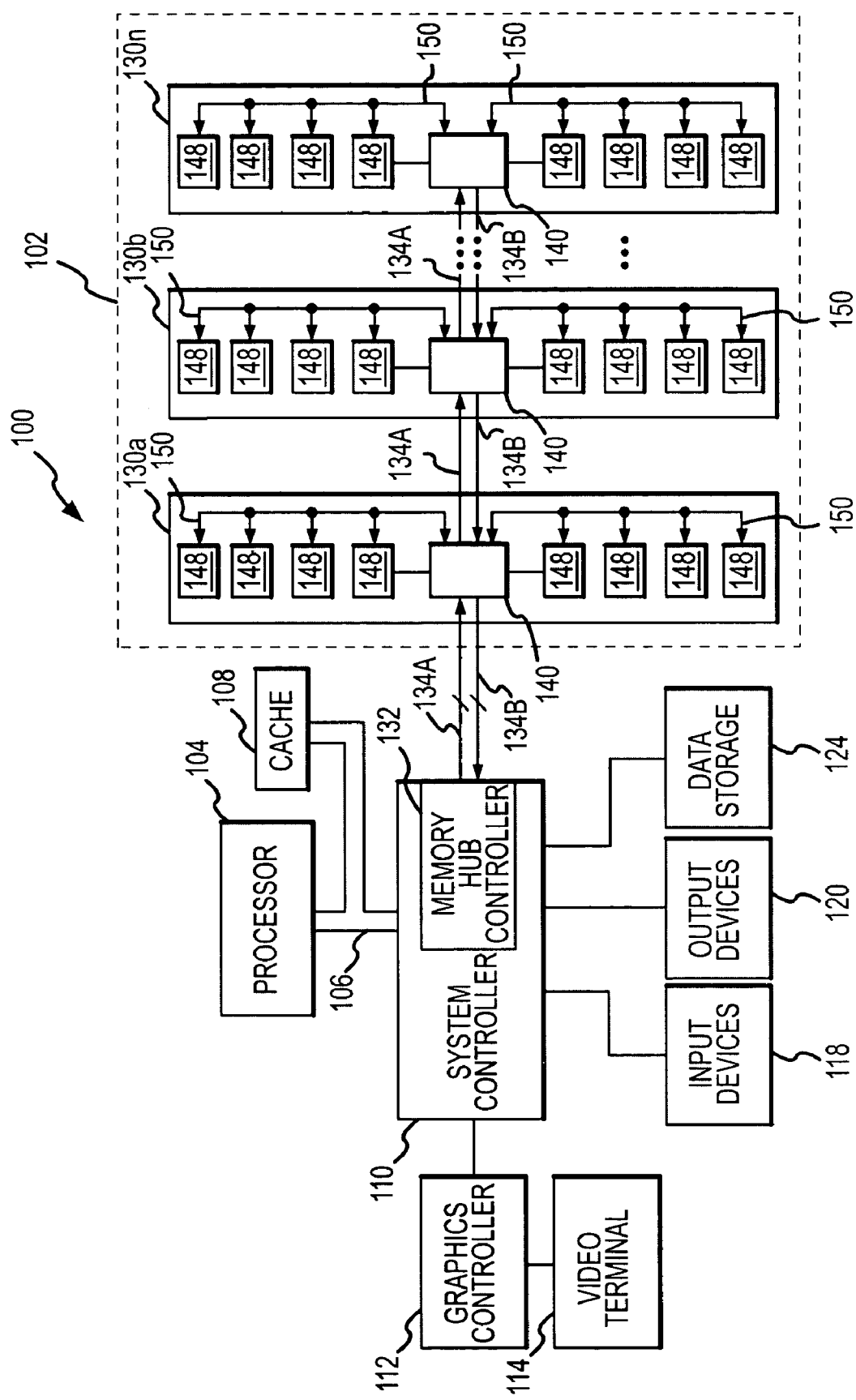
FIG. 1 is a block diagram of a computer system including a system memory having a high bandwidth memory hub architecture according to one example of the present invention.

A computer system 100 according to one example of the present invention is shown in FIG. 1. The computer system 100 includes a system memory 102 having a memory hub architecture including a plurality of memory modules 130, each memory module including a corresponding memory hub 140. Each of the memory hubs 140 arbitrates between memory responses from the memory module 130 on which the hub is contained and memory responses from downstream memory modules, and in this way the memory hubs effectively control the latency of respective memory modules in the system memory by controlling how quickly responses are returned to a system controller 110, as will be described in more detail below. In the following description, certain details are set forth to provide a sufficient understanding of the present invention. One skilled in the art will understand, however, that the invention may be practiced without these particular details. In other instances, well-known circuits, control signals, timing protocols, and/or software operations have not been shown in detail or omitted entirely in order to avoid unnecessarily obscuring the present invention.

The computer system 100 includes a processor 104 for performing various computing functions, such as executing specific software to perform specific calculations or tasks. The processor 104 is typically a central processing unit ("CPU") having a processor bus 106 that normally includes an address bus, a control bus, and a data bus. The processor bus 106 is typically coupled to cache memory 108, which, as previously mentioned, is usually static random access memory ("SRAM"). Finally, the processor bus 106 is coupled to the system controller 110, which is also sometimes referred to as a "North Bridge" or "memory controller."

The system controller 110 serves as a communications path to the processor 104 for the memory modules 130 and for a variety of other components. More specifically, the system controller 110 includes a graphics port that is typically coupled to a graphics controller 112, which is, in turn, coupled to a video terminal 114. The system controller 110 is also coupled to one or more input devices 118, such as a keyboard or a mouse, to allow an operator to interface with the computer system 100. Typically, the computer system 100 also includes one or more output devices 120, such as a printer, coupled to the processor 104 through the system controller 110. One or more data storage devices 124 are also typically coupled to the processor 104 through the system controller 110 to allow the processor 104 to store data or retrieve data from internal or external storage media (not shown). Examples of typical storage devices 124 include hard and floppy disks, tape cassettes, and compact disk read-only memories (CD-ROMs).

The system controller 110 also includes a memory hub controller ("MHC") 132 that is coupled to the system memory 102 including the memory modules 130a,b...n, and operates to apply commands to control and access data in the memory modules. The memory modules 130 are coupled in a point-to-point architecture through respective high speed links 134a and 134b coupled between the memory module 130a and the memory hub controller 132 and between adjacent memory modules 130a-n. The high speed link 134a is the downlink, carrying memory requests from the memory hub controller 132 to the memory modules 130a-n. The high speed link 134b is the uplink, carrying memory responses from the memory modules 130a-n to the memory hub controller 132. The high-speed links 134a and 134b may be optical, RF, or electrical communications paths, or may be some other suitable type of communications paths, as will be appreciated by those skilled in the art. In the event the high-speed links 134a and 134b are implemented as optical communications paths, each optical communication path may be in the form of one or more optical fibers, for example. In such a system, the memory hub controller 132 and the memory modules 130 will each include an optical input/output port or separate input and output ports coupled to the corresponding optical communications paths. Although the memory modules 130 are shown coupled to the memory hub controller 132 in a point-to-point architecture, other topologies that may be used, such as a ring topology, will be apparent to those skilled in the art.

Each of the memory modules 130 includes the memory hub 140 for communicating over the corresponding high-speed links 134a and 134b and for controlling access to eight memory devices 148, which are synchronous dynamic random access memory ("SDRAM") devices in the example of FIG. 1. The memory hubs 140 each include input and output ports that are coupled to the corresponding high-speed links 134a and 134b, with the nature and number of ports depending on the characteristics of the high-speed links. A fewer or greater number of memory devices 148 may be used, and memory devices other than SDRAM devices may also be used. The memory hub 140 is coupled to each of the system memory devices 148 through a bus system 150, which normally includes a control bus, an address bus, and a data bus.

As previously mentioned, each of the memory hubs 140 executes an arbitration process that controls the way in which memory responses associated with the memory module 130 containing that hub and memory responses from downstream memory modules are returned to the memory hub controller 132. In the following description, memory responses associated with the particular memory hub 140 and the corresponding memory module 130 will be referred to as "local responses," while memory responses from downstream memory modules will be referred to as "downstream responses." In operation, each memory hub 140 executes a desired arbitration process to control the way in which local and downstream responses are returned to the memory hub controller 132. For example, each hub 140 may give priority to downstream responses and thereby forward such downstream responses upstream prior to local responses that need to be sent upstream. Conversely, each memory hub 140 may give priority to local responses and thereby forward such local responses upstream prior to downstream responses that need to be sent upstream. Examples of arbitration processes that may be executed by the memory hubs 140 will be described in more detail below.

Each memory hub 140 may execute a different arbitration process or all the hubs may execute the same process, with this determination depending on the desired characteristics of the system memory 102. It should be noted that the arbitration process executed by each memory hub 140 is only applied when a conflict exists between local and downstream memory responses. Thus, each memory hub 140 need only execute the corresponding arbitration process when both local and downstream memory responses need to be returned upstream at the same time. Other examples of arbitration schemes are described in application Ser. No. 10/690,810 entitled "Arbitration System and Method for Memory Responses in a Hub-Based Memory System", incorporated herein by reference.

Figure 2:
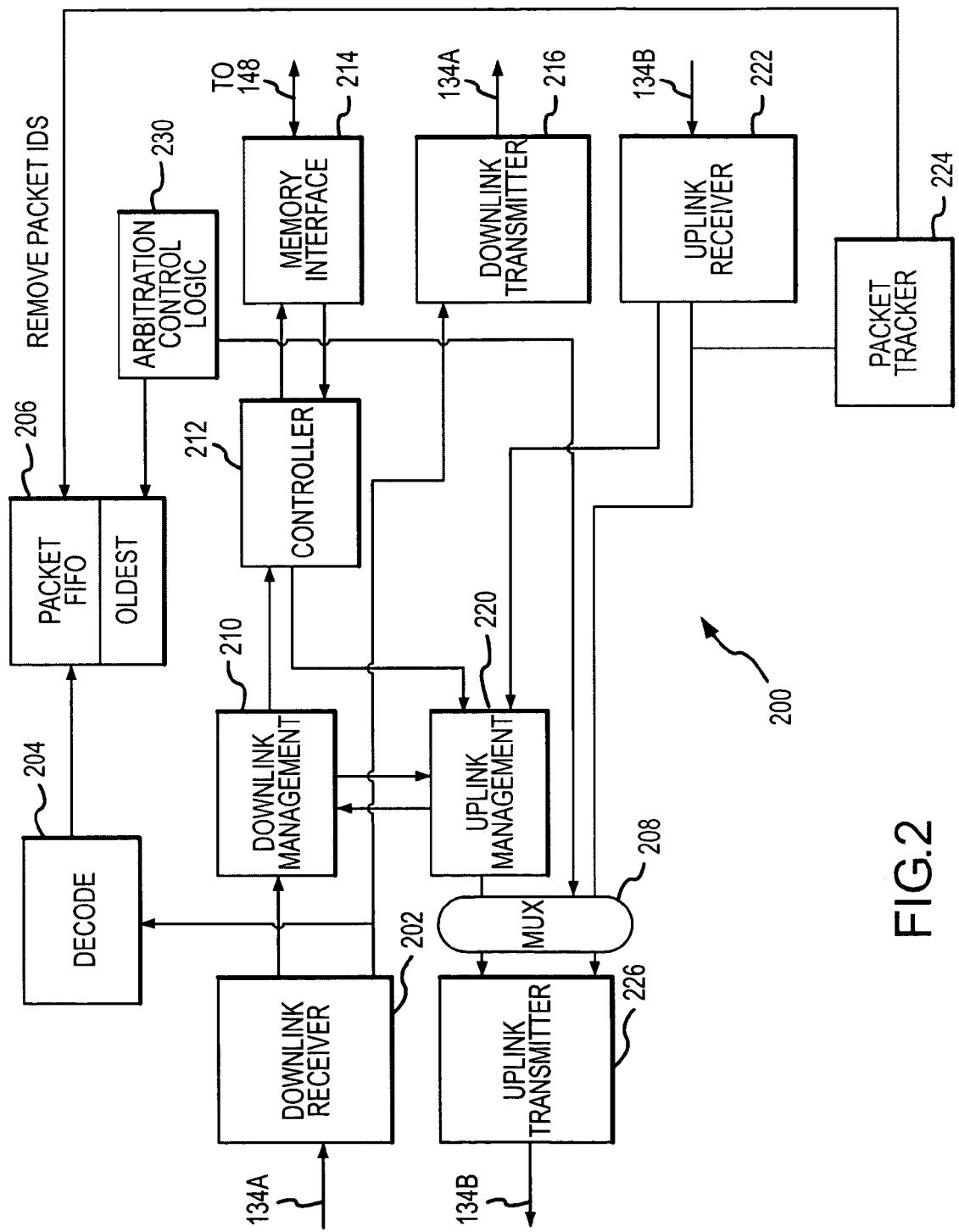
FIG. 2 is a functional block diagram illustrating an arbitration system included in the hub controllers of FIG. 1 according to one example of the present invention.

An example of an arbitration system 200 included in the hub controllers 140 of FIG. 1 is shown in FIG. 2. A downlink receiver 202 receives memory requests. The memory requests include an identifier and a request portion, which includes data in the event the request is a write request. The identifier is referred to herein as a packet ID or a memory request identifier. A decoder 204 is coupled to the downlink receiver 202 and determines the memory request identifier associated with each memory request. The memory request identifiers are stored in a packet memory 206. The packet memory 206 shown in FIG. 2 is a first-in, first-out (FIFO) memory, but other buffering schemes may be used in other embodiments. In this manner, a packet ID or memory request identifier associated with each memory request passed to a hub controller is stored in the packet memory 206. When the packet memory 206 is a FIFO memory, the memory request identifiers are stored in time order. In the following description, memory requests associated with the particular memory hub 140 and the corresponding memory module 130 will be referred to as "local memory requests," while memory requests directed to a downstream memory module 130 will be referred to as "remote memory requests."

Local memory requests received by the downlink receiver 202 are sent through a downlink management module 210 and a controller 212 to a memory interface 214 coupled to the memory devices 148. Local memory responses are received by the memory interface 214 and sent through the controller 212 to an uplink management module 220.

Remote memory requests received by the downlink receiver 202 are sent to a downlink transmitter 216 to be sent on the downlink 134*a* to a downstream hub. An uplink receiver 222 coupled to the uplink 134*b* receives remote memory responses. The remote memory responses include an identifier portion and a data payload portion. The identifier portion, or memory response identifier, identifies the memory request to which the data payload is responsive. A packet tracker 224 is coupled to the uplink receiver. The packet tracker 224 identifies the memory response identifier. In some embodiments, when the remote memory response is sent through an uplink transmitter 226 the packet tracker 224 removes the associated memory request identifier from the packet memory 206.

A multiplexor 208 is coupled to the uplink transmitter 226, the uplink management module 220, the uplink receiver 222, and arbitration control logic 230. The multiplexor 208 couples either data from local memory responses or data from remote memory responses to the uplink transmitter 226. The choice of which type of memory response—local or remote—to couple to the transmitter 226 is determined by a control signal generated by the arbitration control logic 230. The arbitration control logic 230 is coupled to the packet memory 206, and can accordingly determine the oldest memory request in the packet memory 206. When a local request is the oldest memory request in the packet memory 206, the arbitration control logic 230 develops a control signal for the multiplexor 208 that results in the local memory response being coupled to the uplink transmitter 226 for output to the uplink 134*b*. When a remote request is the oldest memory request in the packet memory 206, the arbitration control logic 230 issues a control signal to the multiplexor 208 that results in the remote memory response being coupled to the uplink transmitter 226 for output to the uplink 134*b*. In some embodiments, remote memory responses are coupled to the uplink transmitter 226 by default. In other embodiments, local memory responses are coupled to the uplink transmitter 226 by default.

Figure 3A:
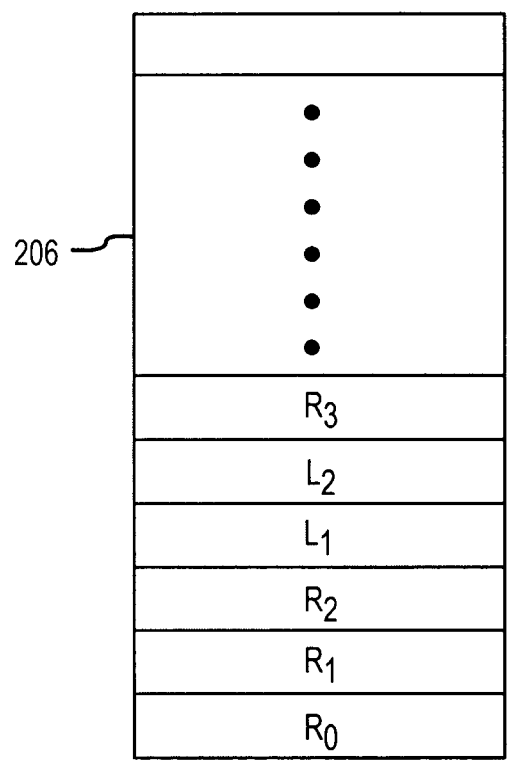
FIGS. 3a and 3b are functional illustrations of a packet memory shown in FIG. 2 according to one example of the present invention.
Figure 3B:
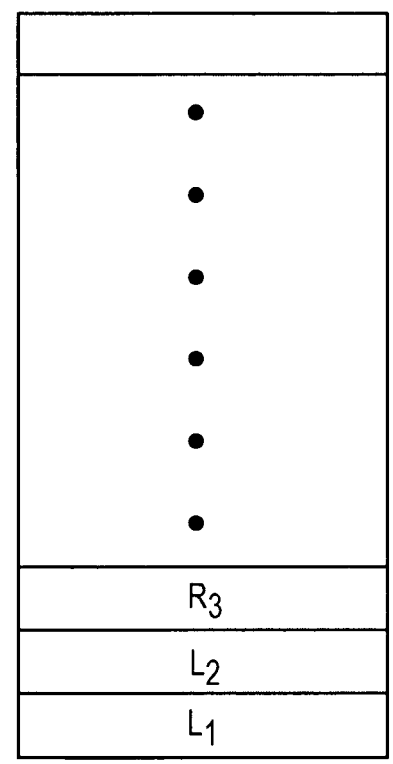

An example of the packet memory 206 is illustrated in FIGS. 3*a-b*. In the illustrated embodiment of FIG. 3*a*, remote requests $R_0$, $R_1$, and $R_2$ were received, and the request identifiers stored in the packet memory. The local requests $L_1$ and $L_2$ were then received, followed by $R_3$, and so on. In this example, remote memory responses are forwarded as received, and the corresponding request identifier is removed from the packet memory 206. Even if the local memory response to request $L_1$ is received, if the link is in use, the local response is not sent until the request $L_1$ is the oldest in the packet memory 206, as illustrated in the example shown in FIG. 3*b*, where responses associated with requests $R_0$, $R_1$, and $R_2$ have been sent.

In the preceding description, certain details were set forth to provide a sufficient understanding of the present invention. One skilled in the art will appreciate, however, that the invention may be practiced without these particular details. Furthermore, one skilled in the art will appreciate that the example embodiments described above do not limit the scope of the present invention, and will also understand that various equivalent embodiments or combinations of the disclosed example embodiments are within the scope of the present invention. Illustrative examples set forth above are intended only to further illustrate certain details of the various embodiments, and should not be interpreted as limiting the scope of the present invention. Also, in the description above the operation of well known components has not been shown or described in detail to avoid unnecessarily obscuring the present invention. Finally, the invention is to be limited only by the appended claims, and is not limited to the described examples or embodiments of the invention.

The invention claimed is:

1. A memory hub, comprising:
    a decoder being operable to receive memory requests including local memory requests directed to memory devices connected directly to the memory hub and remote memory requests directed to memory devices coupled to other memory hubs, the decoder being operable to determine a memory request identifier associated with each memory request;
    a packet memory coupled to the decoder, the packet memory being operable to receive memory request identifiers from the decoder and to store the received memory request identifiers;
    a multiplexor being operable to couple either remote memory responses that are received responsive to the remote memory requests or local memory responses that are received responsive to the local memory requests to an output responsive to a control signal; and arbitration control logic coupled to the multiplexor and the packet memory and being operable to determine from the memory request identifiers stored in the packet memory the recency of the memory requests corresponding to the received remote memory responses and the local memory responses and to generate the control signal based on the determination.

2. The memory hub of claim 1 wherein the arbitration control logic generates the control signal based on an oldest memory request identifier in the packet memory.

3. The memory hub of claim 1 wherein the packet memory is a first-in, first-out (FIFO) memory.

4. The memory hub of claim 1 wherein the arbitration control logic generates the control signal such that if an oldest memory request identifier stored in the packet memory is for a local memory request, the multiplexor outputs a local memory response.

5. The memory hub of claim 1 wherein each of the local and remote memory responses comprise data and a header identifying a memory request corresponding to the memory response.

6. The memory hub of claim 1, further comprising a packet tracker coupled to the packet memory, the packet memory being operable to receive the remote memory responses and to associate each received remote memory response with a memory request identifier stored in the packet memory, the packet tracker being operable to cause the memory request identifier to be removed from the packet memory.

7. A memory hub being operable to receive local memory responses and remote memory responses, the memory hub being operable to apply an arbitration algorithm to select the order in which the local and remote memory responses are provided on an uplink output based on the ages of memory requests corresponding to the local and remote memory responses.

8. The memory hub of claim 7 wherein the memory hub further comprises a packet memory that stores memory request identifiers in an order in which the corresponding memory requests are received.

9. The memory hub of claim 8 wherein the memory hub further comprises a multiplexer coupled to the packet memory, the multiplexor providing either a local or a remote memory response on an output responsive to a control signal.

10. The memory hub of claim 9 wherein the memory hub further comprises arbitration logic coupled to the packet memory and the multiplexer, and wherein the arbitration logic applies the control signal to the multiplexor to control which memory responses are provided on the output.

11. The memory hub of claim 7 wherein each of the local and remote memory responses comprise data and a header identifying a memory request corresponding to the memory response.

12. A memory module, comprising:
a plurality of memory devices; and
a memory hub coupled to the memory devices, the memory hub comprising:
a decoder adapted to receive memory requests including local memory requests directed to memory devices connected directly to the memory hub and remote memory requests directed to memory devices coupled to other memory hubs, the decoder being operable to determine a memory request identifier associated with each memory request;
a packet memory adapted to receive memory request identifiers and store the memory request identifiers;
a multiplexor adapted to receive remote memory responses that are responsive to the remote memory requests and local memory responses that are responsive to the local memory requests and being operable to select either the remote memory responses or the local memory responses in response to a control signal; and
arbitration control logic coupled to the multiplexor and the packet memory and being operable to determine from the memory request identifiers stored in the packet memory the recency of the memory requests corresponding to the received remote memory responses and the local memory responses and to generate the control signal to control selection of which memory response to output based on the determination.

13. The memory module of claim 12 wherein each of the memory devices comprise an SDRAM.

14. The memory module of claim 12 wherein the arbitration control logic generates the control signal based on an oldest memory request identifier in the packet memory.

15. The memory module of claim 12 wherein the packet memory is a first-in, first-out (FIFO) memory.

16. The memory hub of claim 12 wherein the arbitration control logic generates the control signal such that if an oldest memory request identifier stored in the packet memory is for a local memory request, the multiplexor outputs a local memory response.

17. The memory hub of claim 12 wherein each of the local and remote memory responses comprise data and a header identifying a memory request corresponding to the memory response.

18. The memory module of claim 12, further comprising a packet tracker adapted to receive the remote memory responses and being operable to associate each remote memory response with a memory request identifier stored in the packet memory and remove the associated memory request identifier from the packet memory.

19. A memory system, comprising:
a memory hub controller;
a plurality of memory modules, each memory module being coupled to adjacent memory modules through respective high-speed links, at least one of the memory modules being coupled to the memory hub controller through a respective high-speed link, and each memory module comprising:
a plurality of memory devices; and
a memory hub coupled to the memory devices, the memory hub comprising,
a decoder adapted to receive memory requests including local memory requests directed to memory devices connected directly to the memory hub and remote memory requests directed to memory devices coupled to other memory hubs, the decoder being operable to determine a memory request identifier associated with each memory request;
a packet memory adapted to receive memory request identifiers and store the memory request identifiers;
a multiplexor adapted to receive remote memory responses that are responsive to the remote memory requests and local memory responses that are responsive to the local memory requests and being operable to select either the remote memory responses or the local memory responses in response to a control signal; and
arbitration control logic coupled to the multiplexor and the packet memory and being operable to determine from the memory request identifiers stored in the packet memory the recency of the memory requests corresponding to the received remote memory responses and the local memory responses and to generate the control signal to control selection of which memory response to output based on the determination.

20. The memory system of claim 19 wherein each of the high-speed links comprises an optical communications link.

21. The memory system of claim 19 wherein at least some of the memory devices comprise SDRAMs.

22. The memory system of claim 19 wherein the arbitration control logic generates the control signal based on the age of the memory request identifiers stored in the packet memory.

23. The memory system of claim 22 wherein the arbitration control logic generates the control signal such that if an oldest memory request identifier stored in the packet memory is for a local memory request, the multiplexor outputs a local memory response.

24. The memory system of claim 19 wherein the packet memory is a first-in, first-out (FIFO) memory.

25. The memory system of claim 19 wherein each of the local and remote memory responses comprise data and a header identifying a memory request corresponding to the memory response.

26. The memory system of claim 19, further comprising a packet tracker adapted to receive the remote memory responses and being operable to associate each remote memory response with a memory request identifier stored in the packet memory and remove the associated memory request identifier from the packet memory.

27. A computer system, comprising:
a processor;
a system controller coupled to the processor, the system controller including a memory hub controller;
an input device coupled to the processor through the system controller;
an output device coupled to the processor through the system controller;
a storage device coupled to the processor through the system controller;
a plurality of memory modules, each memory module being coupled to adjacent memory modules through respective high-speed links, at least one of the memory modules being coupled to the memory hub controller through a respective high-speed link, and each memory module comprising:
a plurality of memory devices; and
a memory hub coupled to the memory devices and coupled to the corresponding high-speed links, the memory hub including,
a decoder adapted to receive memory requests including local memory requests directed to memory devices connected directly to the memory hub and remote memory requests directed to memory devices coupled to other memory hubs, the decoder being operable to determine a memory request identifier associated with each memory request;
a packet memory adapted to receive memory request identifiers and store the memory request identifiers;
a multiplexor adapted to receive remote memory responses that are responsive to the remote memory requests and local memory responses that are responsive to the local memory requests and being operable to select either the remote memory responses or the local memory responses in response to a control signal; and
arbitration control logic coupled to the multiplexor and the packet memory and being operable to determine from the memory request identifiers stored in the packet memory the recency of the memory requests corresponding to the received remote memory responses and the local memory responses and to generate the control signal to control selection of which memory response to output based on the determination.

28. The computer system of claim 27 wherein each of the high-speed links comprises an optical communications link.

29. The computer system of claim 27 wherein at least some of the memory devices comprise SDRAMs.

30. The computer system of claim 27 wherein each of the local and downstream memory responses comprise data and a header identifying a memory request corresponding to the memory response.

31. The computer system of claim 27 wherein the processor comprises a central processing unit (CPU).

32. The computer system of claim 27, further comprising a packet tracker adapted to receive the remote memory responses and being operable to associate each remote memory response with a memory request identifier stored in the packet memory and remove the associated memory request identifier from the packet memory.

33. In a memory system including a plurality of memory modules, each memory module including a memory hub coupled to memory devices, a method of processing and forwarding memory responses in the memory hub of each memory module, comprising:
receiving memory requests, each having a memory request identifier, the memory requests including local memory requests directed to memory devices connected to the memory hub and remote memory requests directed to memory devices coupled to memory hubs in other memory modules;
storing the memory request identifiers;
storing local memory responses received from the memory devices in response to the local memory requests;
storing remote memory responses received from the other memory modules in response to the remote memory requests;
applying in at least one hub an arbitration algorithm based on the ages of the stored memory request identifiers to determine an order in which the stored local and remote memory responses are forwarded; and
forwarding the local and remote memory responses upstream according to the determined order.

34. The method of claim 33 wherein each of the local and remote memory responses comprise data and a header identifying a memory request corresponding to the memory response.

35. The method of claim 33 further comprising generating a control signal to indicate the order based on an oldest stored memory request identifier.

36. The method of claim 33, wherein the memory request identifiers are stored and accessed on a first-in, first-out (FIFO) basis.

37. The method of claim 33, further comprising generating a control signal such that if an oldest stored memory request is a local memory request, a local memory response is forwarded.

* * * * *